United States Patent
Cashman et al.

(10) Patent No.: US 11,321,007 B2
(45) Date of Patent: May 3, 2022

(54) DELETION OF VOLUMES IN DATA STORAGE SYSTEMS

(71) Applicant: International Business Machines Corporation, Armonk, NY (US)

(72) Inventors: Paul Nicholas Cashman, Alton (GB); Gemma Izen, Winchester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/941,693

(22) Filed: Jul. 29, 2020

(65) Prior Publication Data

US 2022/0035556 A1 Feb. 3, 2022

(51) Int. Cl.
*G06F 3/06* (2006.01)
*G06F 12/10* (2016.01)

(52) U.S. Cl.
CPC .......... *G06F 3/0652* (2013.01); *G06F 3/0604* (2013.01); *G06F 3/0644* (2013.01); *G06F 3/0659* (2013.01); *G06F 3/0664* (2013.01); *G06F 3/0673* (2013.01); *G06F 12/10* (2013.01); *G06F 2212/657* (2013.01)

(58) Field of Classification Search
CPC .... G06F 3/0652; G06F 3/0604; G06F 3/0659; G06F 3/0644; G06F 3/0664; G06F 3/0673; G06F 12/10; G06F 2212/657
See application file for complete search history.

(56) References Cited

U.S. PATENT DOCUMENTS

| | | | | |
|---|---|---|---|---|
| 2006/0075007 | A1* | 4/2006 | Anderson | G06F 3/0652 |
| 2011/0264704 | A1* | 10/2011 | Mehra | G06F 16/289 |
| | | | | 707/802 |
| 2013/0018852 | A1* | 1/2013 | Barton | G06F 16/162 |
| | | | | 707/E17.007 |
| 2013/0117524 | A1 | 5/2013 | Helman | |
| 2016/0232059 | A1 | 8/2016 | Khurange | |
| 2018/0373446 | A1 | 12/2018 | Mulholland | |
| 2019/0310968 | A1 | 10/2019 | Attarde | |

(Continued)

OTHER PUBLICATIONS

"Delete Blob (REST API)—Azure Storage | Microsoft Docs", Sep. 23, 2019, 4 pages, <https://docs.microsoft.com/en-us/rest/api/storageservices/delete-blob>.

(Continued)

*Primary Examiner* — Gary W. Cygiel
(74) *Attorney, Agent, or Firm* — David B. Woycechowky

(57) ABSTRACT

Storing data volumes in virtual and physical address spaces such that the data units are contiguous in virtual address space but fragmented in physical address space. The mapping between virtual and physical address space is managed by a storage controller that is configured to implement deletes reversibly with a so-called soft delete, the soft delete being reversible up to a later permanent or hard delete. A soft delete triggers a compaction in which the data units of the to-be-deleted volume are gathered together in physical address space. During the time between compaction and hard delete (or restore), the soft deleted volume is thus stored in a space efficient manner. Moreover, the subsequent hard delete can be performed more quickly than if the soft deleted volume were still fragmented across physical address space freeing up space quicker.

3 Claims, 9 Drawing Sheets

(56) References Cited

U.S. PATENT DOCUMENTS

2019/0339873 A1    11/2019  Mainali
2021/0216524 A1*    7/2021  Agarwal ............. G06F 11/1469

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

* cited by examiner

DELETION OF VOLUMES IN DATA STORAGE SYSTEMS

BACKGROUND

The present disclosure relates to data storage management and in particular to methods and systems for managing the deletion of volumes in such systems.

Storage facilities may be based on a storage pool of multiple volumes or several pools grouped together in a data storage system. A storage pool is a grouping of volumes using the same backend or internal storage. A data storage system is a cluster for one or more storage pools. Data storage systems typically store data on physical media in a manner that is transparent to host servers. From the perspective of a host server, data are stored on virtual storage devices that are commonly known as logical volumes. Logical volumes are typically configured to store the data required for a specific data processing application. Data storage systems map logical volumes to addressable physical locations on storage media, such as hard disks. Host servers typically require large numbers of volumes in order to store large amounts of data. Typically, a set of servers is connected to a storage subsystem that presents volumes and services related to those volumes.

In conventional system storage architectures, data are stored in logical structures on one or more logical volumes and are accessed with the assistance of logical addresses, or "pointers," associated with the logical structures. User data on a storage volume may be kept in logical structures called "data sets," and pointers to these data sets are maintained within certain records in a contents manager. When a data set is deleted, the pointers to the data set within the records are destroyed and access to the user data are lost. However, the data itself is still stored to the storage volume. Unless and until the data set is erased from the volume when the pointer is deleted, or new data are written over the data sets, the original data are preserved, even though the system now lacks pointers to the data.

The motivation for permanently deleting data may vary. The system may simply be full and need to delete old data that is no longer of interest in order to free up storage capacity for new data. Regulatory compliance may also impose a legal requirement that data are permanently deleted.

Often as a result of human error, data may be accidentally deleted, or the wrong data may be deleted by mistake, resulting in the loss of valuable information and deleterious effects on production efficiency. These deletion events may be infrequent occurrences but, when they do occur, the results can be catastrophic depending on the contents of the data set and/or the system processes relying upon what has been deleted. As storage environments become more complex and are co-managed by multiple administrators, such accidental volume deletion is becoming increasingly common.

In a modern storage subsystem that provides virtualization of physical storage, volumes typically make use of regions of the physical storage for the purposes of allocating that physical storage to a volume that is then presented to a host system. In such a system, deletion of the volume would free up the allocated physical storage ready for reuse at a later stage. This might involve a process called garbage collection (or space reclamation) that reclaims unused space and returns it back to the system to use for fresh data storage.

Because deleted data are not usually physically removed instantly, it is possible to ensure that regions of deleted data are preserved for some time after their nominal deletion, since the act of deletion will typically only unprotect the partitions or other data units of physical storage where the data are physically stored, which gives permission to the operating system to overwrite these sectors with new data. It may thus be possible to restore an accidentally deleted volume so long as the deleted volume is still in place in physical storage along with its metadata. However, over time the restoration of the deleted volume will become impossible, since at some point the physical storage will be reused. Furthermore, in some cases there is a legal requirement to permanently delete the original data. In the special case that data must be deleted for legal reasons, for example, deletion of personal data to comply with the European Union General Data Protection Regulation (EU 2016/679), it may still be compliant to adopt a deletion protocol that does not immediately remove the deleted data from physical storage. Another example would be to comply with contractual obligations, for example, to delete confidential information upon expiration of a non-disclosure agreement or termination of a joint venture, or to delete content upon termination of a music or video license. Even with a legal requirement, it may still be compliant to delay removal from physical storage by a fixed amount of time, such as a number of days or weeks.

A common way to approach deletion is to provide a two-stage deletion process initiated by a "soft delete" and then completed by a "hard delete" (or permanent delete). Soft deletion refers to marking data, such as a database record in a database, or a file or a volume in a file storage system, for deletion, but not actually deleting the record or file or volume from physical storage, even though it may be hidden from the user(s) after the soft delete.

BRIEF SUMMARY

The proposed system and method manage deletion of volumes in storage systems that operate with data reduction through virtualization (thin provisioning) and optionally also deduplication.

In one aspect of the present invention, a method, a computer program product, and a system includes: (i) determining to permanently delete a data volume in a virtualized data storage system, the data volume being stored in a virtual address space, the data volume being mapped to a physical address space; (ii) performing a soft delete of the data volume by marking for deletion a set of data units associated with the data volume; (iii) taking a compacting action on the set of data units, the set of data units being gathered together in the physical address space by the compacting action; (iv) determining to restore the data volume instead of permanently deleting the data volume; and (v) restoring the data volume to the virtualized data storage system including unmarking the set of data units for deletion.

BRIEF DESCRIPTION OF THE DRAWINGS

In the following, the present invention will further be described by way of example only with reference to exemplary embodiments illustrated in the figures.

DETAILED DESCRIPTION

Figure 1:
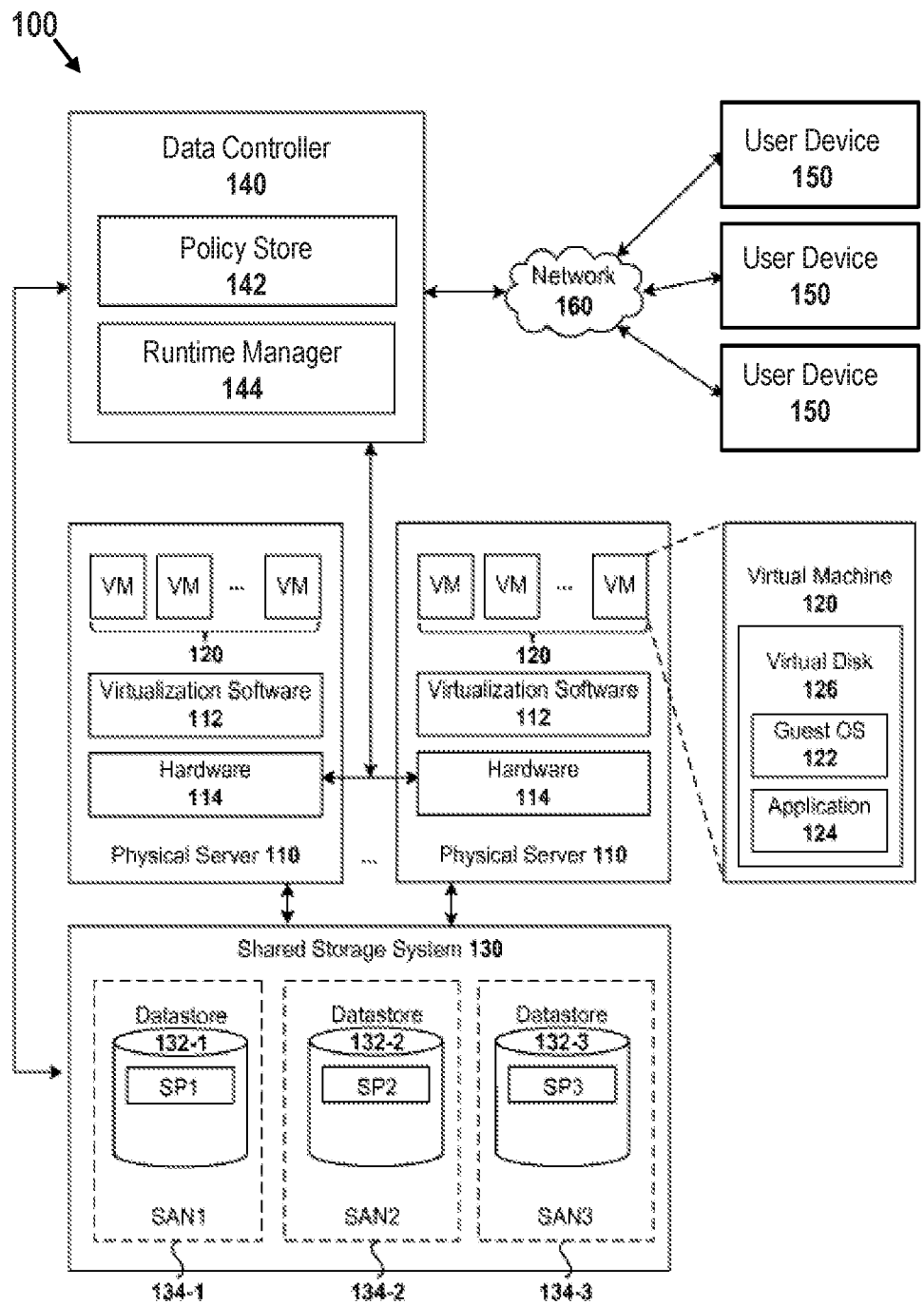
FIG. 1 is a block diagram of a multi-tiered data storage system incorporating a virtualized storage array in which embodiments of the disclosure can be implemented.

Storing data volumes in virtual and physical address spaces such that the data units are contiguous in virtual address space but fragmented in physical address space. The mapping between virtual and physical address space is managed by a storage controller that is configured to implement deletes reversibly with a so-called soft delete, the soft delete being reversible up to a later permanent or hard delete. A soft delete triggers a compaction in which the data units of the to-be-deleted volume are gathered together in physical address space. During the time between compaction and hard delete (or restore), the soft deleted volume is thus stored in a space efficient manner. Moreover, the subsequent hard delete can be performed more quickly than if the soft deleted volume were still fragmented across physical address space freeing up space quicker.

In virtualized storage systems, since volume data from multiple volumes and their respective metadata are in general distributed in an intermixed and fragmented form over physical storage, it is non-trivial to manage volumes between their soft and hard deletion. In virtualized storage systems in which a Log Structured Array is used to store data for a set of associated volumes, deleted data will in general be physically stored among non-deleted data relating to other volumes. Keeping the deleted data available after soft deletion will impact on reclaiming free space from the tail of the log (that is, the form of garbage collection performed in log structured arrays) by imposing constraints on how data are moved from the tail of the log.

In storage systems that are applying not only virtualization, but also in parallel other concepts such as replication and deduplication, the implementation of soft deletion functions can become quite complex.

Replication is the mechanism of holding multiple, redundant copies of data using mirroring or point-in-time copies. Data to be replicated is transferred between volumes when performing a backup or mirroring operation. Storage with replication will typically be organized in virtualized storage arrays.

Deduplication is the mechanism of storing references to source grains in metadata whenever a new write's input/output (I/O) data matches data already written by a grain, instead of carrying out the write conventionally which would result in the same data being stored again. A grain is the unit of address space that is the subject of I/O operations, for example: writes, reads, deletes. A grain is effectively the unit of granularity of a deduplication engine. A grain that contains a reference to a source is called a referrer. Generally, with deduplication, an arbitrary number of referrers may point to a common source.

In such modern complex systems, it also becomes difficult to manage "delete protection" tags which are used to mark a volume, partition, file, database record or other data item so as to prevent a delete command being actioned on that data item. For example, when using virtual storage thin provisioning, the task of permanently deleting volumes is complicated, because some of the physical partitions that are used by one volume may also be used by other volumes. Thus, uncontrolled release of a physical partition on deletion of a volume that uses it may damage other volumes.

A storage management process for virtual storage may prolong the time between a soft delete and the underlying data being removed with a hard delete. The soft deleted data are aggregated into physical extents which optimize the storage efficiency of soft deleted data and so give them a longer persistence before hard deletion. In particular, when a user soft deletes a certain logical volume, the storage controller does not release the physical partitions used by this volume, but rather defines the volume as provisionally deleted. Space permitting, the storage controller retains the physical partitions used by the provisionally deleted volume, as well as the pointers to these physical partitions, and does not allocate the physical partitions to other volumes. The provisionally deleted volume is moved from a list of valid volumes into a list ("recycling bin") of provisionally deleted volumes. The user may reclaim a soft deleted volume from the recycle bin by requesting the storage controller to return the volume to the list of valid volumes. A volume that is deleted by a user is thus marked as invisible to the user but is retained and may be recovered later if desired. The soft deleted partition is only hard deleted when some aspect of that storage is required for reuse.

According to one aspect of the disclosure, there is provided a virtualized data storage system for storing volumes of data in virtual and physical address spaces. Each data volume comprises a number of units of data which are contiguous in virtual address space but are in general fragmented in physical address space. The system comprises a plurality of physical data storage devices on which the data units are stored according to a physical address space and a data storage controller operable to manage a virtual address space and its mapping to the physical address space. The data storage controller is configured to implement a delete command by which a data volume can be deleted. The delete command is actioned by: (i) a soft delete in which the volume's data units are marked for deletion; (ii) a compaction in which the data units of the to-be-deleted volume are gathered together in physical address space; and/or (iii) a permanent delete in which the virtual and physical address space is de-allocated.

The data storage controller may additionally have a restore command by which a volume that has been subject to a delete command but not yet permanently deleted can be recovered. The restore command is actioned by recreating the deleted volume.

The permanent delete can be triggered after a variable or fixed time delay from the delete command. A fixed time delay may be defined as a fixed time after the delete command, or as a fixed date/time according to a timestamp. In the case of a variable time delay, this can be managed by a counter operable to run from a start value to an end value.

In some embodiments, the counter is started running on completion of the compaction. How quickly to run the counter can be varied under control of the data storage controller according to some measure of spare capacity of the storage system, such that if storage capacity is scarce the counter runs faster. In other embodiments, the time delay is fixed to provide certainty that the permanent delete will be actioned at a defined time. In still further embodiments, the time delay is defined by a combination of a fixed component to provide certainty that the permanent delete will be actioned at the latest by a defined time and a variable component managed by a counter that is operable to run from a start value to an end value.

It is advantageous if the compaction is configured to arrange the data units of the to-be-deleted volume, so they occupy only one, or a small plural number of, contiguous ranges in physical address space. The soft delete may involve blocking subsequent input/output, I/O, to the volume.

The permanent delete may optionally be configured to wipe the physical storage associated with the physical address space of the deleted volume's data units. This can be important if it is necessary, for example, for legal compliance, to preclude a later physical recovery of the data units.

Compaction may be subsumed in garbage collection. Specifically, assuming the data storage controller also manages a garbage collection process, the compaction can be integrated in the garbage collection such that the compaction is triggered when garbage collection encounters a volume subject to a delete command, which might be by encountering a data unit of the volume, or the volume's metadata or an element of these metadata.

The proposed delete command can be integrated with deduplication. In a deduplicated storage system, duplicate data units in virtual address space associated potentially with multiple volumes are mapped to a single data unit in physical address space according to a referencing domain consisting of a source data unit (for example, a source grain) in virtual address space mapping to the corresponding data unit in physical address space and one or more referrer data units (for example, referrer grains) mapping to the same data unit in physical address space via the source data unit. The delete command can be integrated with the deduplication through adaptation of the compaction process. The compaction further involves re-organizing referencing domains by detecting if the to-be-deleted volume includes a referencing domain that has at least one source data unit in the to-be-deleted volume and at least one referrer data unit located in a volume that has not been subject to a delete command. If 'yes' the source data unit is converted to a referrer data unit and the (or one of the) referrer data unit(s) in a volume that has not been subject to a delete command is converted to the source data unit for the referencing domain. In other words, the source data unit in the soft deleted volume is swapped for one of the referrer data units of an active volume. If the referencing domain reorganization is performed prior to gathering the data units of the to-be-deleted volume together, then this will be the most space efficient, since gaps in the compacted volume will be avoided.

According to another aspect of the disclosure, there is provided a computer automated method of managing a virtualized data storage system that stores volumes of data in a virtual and a physical address space, each data volume comprising a number of units of data which are contiguous in virtual address space, but are in general fragmented in physical address space, the method comprising managing a virtual address space and its mapping to the physical address space; and actioning a delete command to delete a data volume by: (i) performing a soft delete in which the volume's data units are marked for deletion; (ii) performing a compaction to gather together the data units of the to-be-deleted volume in physical address space; and/or (iii) performing a permanent delete by de-allocating the virtual and physical address space, thereby freeing up the physical address space for reuse.

According to another aspect of the disclosure, there is provided a computer program stored on a computer readable medium and loadable into the internal memory of a computing device, comprising software code portions, when said program is run on a computing device, for performing the above-defined method. A computer program product may also be provided which stores the above-mentioned computer program.

The proposed system and method also allow the storage pool to reclaim space in a timely fashion when needed. The method is operable in a storage system that implements data deduplication, as well as optionally other data reduction techniques. The disclosure may find applicability in shared storage systems, such as virtualized storage arrays, physical disks and hypervisor data stores.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

FIG. 1 is a block diagram of a system 100 incorporating a virtualized storage array according to an embodiment of the invention. The storage system 100 includes physical storage devices in the form of physical servers 110 that each execute virtualization software 112 (for example, hypervisor) and include suitable hardware 114 to support multiple virtual machines 120. The storage system 100 further includes a data storage controller 140, which may be accessed by one or more user devices 150 via a network 160. The data storage controller 140 provides policy management for the virtualization, which is subsumed in a policy store 142, and also virtual machine provisioning via a runtime manager 144. The user devices 150 may be operated by any suitable users, such as system administrators, organization administrators, database users, application developers and/or system architects. The virtualization software 112 maintains a mapping between virtual resources and physical resources of physical server 110, such as CPU resources (for example, processors), memory resources (for example, random access memory) and network resources (for example, access networks). Virtual machines 120 are also provisioned with storage resources, such as a shared storage system 130 having multiple datastores 132-1, 132-2 and 132-3 which are collectively referred to as datastore 132.

The term "datastore" may broadly refer to a logical container that hides specifics of the underlying storage resources to provide a uniform model for storing virtual machine data. The datastores 132-*n* may each represent a formatted file system that physical servers 110 mount and share. The file system may be a cluster file system that supports virtualization, for example, such as Virtual Machine File System (VMFS) and Network File System (NFS) provided by network attached storage (NAS). The term "datastore" may also refer to one or more storage pools that each represents a logical slice of datastore 132. In the example in Figure. 1, datastores 132-1 to 132-3 are illustrated as each including one storage pool, labeled "SP1", "SP2" and "SP3" respectively.

In practice, the datastores 132 on the shared storage system 130 may have different capabilities defined in terms of capacity, I/O capability, and/or disk format. For example, the shared storage system 130 may include multiple storage devices (for example, see 134-1 to 134-3) of any suitable technology, such as storage area networks (SAN) and NASs. SAN devices generally use access protocols such as Internet Small Computer System Interface (iSCSI) and fiber channel to provide block level access to storage resources. On the other hand, NAS devices generally support file-based protocols such as NFS to provide shared file-level access to storage resources.

In the example illustrated in FIG. 1, the shared storage system 130 includes three SAN devices on which the datastores 132-*n* are located, that is datastore "SP1" on "SAN1", datastore "SP2" on "SAN2" and datastore "SP3" on "SAN3". Although only SAN devices are shown in FIG. 1 for simplicity, the shared storage system 130 may include NAS devices, or a combination of SAN and NAS devices. Depending on the characteristics of the underlying storage devices, datastores 132 may be used for different storage purposes.

Each virtual machine 120 may support a guest operating system 122 and at least one application 124 (for example, a database instance). When creating the virtual machine 120, a certain amount of storage resource is allocated to the virtual machine 120. In particular, a virtual disk 126 is created for virtual machine 120 to store data (for example, files) for the virtual machine 120. The term "virtual disk" may generally refer to an entity that appears to the guest operating system 122 as a single disk.

A virtual disk 126 may be used by a virtual machine 120 to store different types of data, such as: (i) data relating to (guest) operating systems; (ii) data for applications; (iii) database data; (iv) database log data; and/or (v) backup data. At a chosen tier of the virtualization, different ones of the virtual disks may be created for storing data of each data type (for example, a backup data disk, an OS (operating system) data disk) and a single virtual machine 120 will run multiple ones of such virtual disks 126.

The process of deciding the mapping between physical and virtual storage, that is mapping between datastores 132-*n* and virtual disks 126 of virtual machine 120 is known as "data placement" or just "placement". Placement may be determined when the virtual machine 120 is created during provisioning, or when an additional virtual disk is added to an existing virtual machine. Completing the placement process results in a given virtual disk residing on, and its data stored on, one or more of the datastores 132-*n*.

The data placement process is carried out in the data controller 14 by the runtime manager 144 following data placement policies stored in the policy store 142. The data placement policies are specified in such a way that data placement can be fully automated, although it may be useful to allow the option of some element of manual intervention by a user with system administrator rights.

Figure 2:
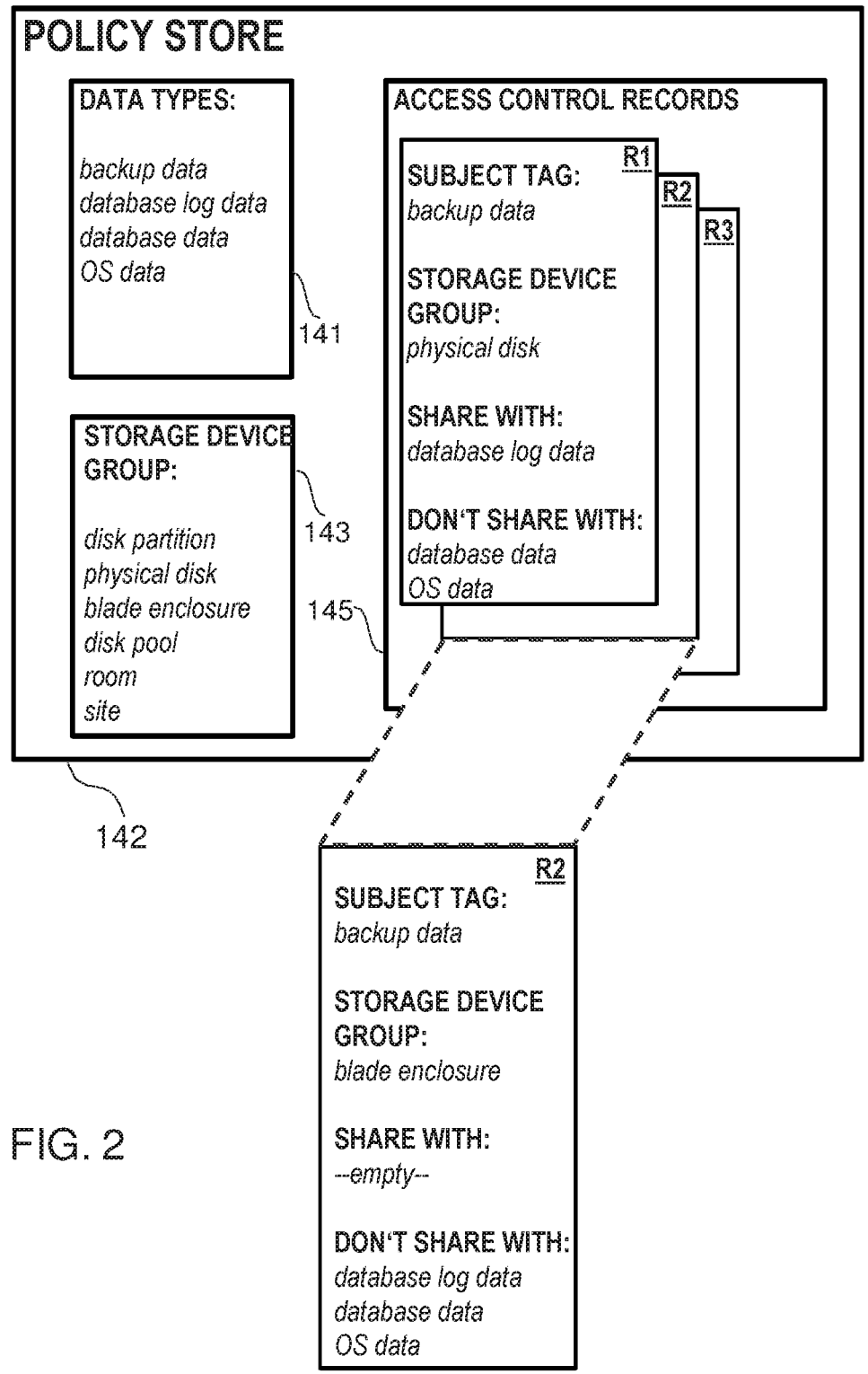
FIG. 2 shows the policy store of FIG. 1 in more detail.

FIG. 2 shows the policy store 142 of FIG. 1 in more detail. The policy store 142 has a data type record 141 in which is stored a list of the data types that are recognized by the system. The example data types illustrated are: (i) backup data; (ii) database log data; (iii) database data; and/or (iv) OS data. The policy store 142 also has a storage device group record 143 in which is stored a list of the data storage device groups that are recognized by the system. The example storage device groups illustrated are: (i) partition; (ii) physical disk; (iii) blade enclosure; (iv) disk pool; and/or (v) room and site. The policy store 142 also has an area 145 for storing access control records R1, R2, R3 . . . . R*n*. Each access control record specifies the data storage device group to which it applies. The example illustrated access control record R1 is specific to the storage device group "physical disk". The subject tag is "backup data". As such, record R1 defines the policy specifying how backup data may be stored with other data types in a physical disk. A "Share with/Don't Share with" part of the access control record R1 specifies that backup data are permitted to be shared on a physical disk with database logs, and that backup data are not permitted to be shared on a physical disk with database data or OS data. Although the "Share with" and "Don't Share with" are illustrated as being separate lists, logically speaking one of these lists is redundant, that is, the record only needs to express which data types can be shared, or which cannot be shared, in order to provide a complete specification. Nevertheless, it is a useful feature to have separate lists for "Share with" and "Don't Share with", since this allows the specification to be expressed either inclusively or exclusively, or both at the same time, as desired. That is to say, "(Do) Share with X" can be used to express also by implication "Don't share with" anything else. Similarly, "Don't share with Y" by implication means "(Do) Share with" anything else. Moreover, "Don't share with X" in combination with "Do share with Y", means that the data can't be shared with X, but can be with Y and nothing else. The simultaneous provision of both "Share with" and "Don't share with" therefore makes configuration more flexible.

In FIG. 2, the contents of a second example access control record R2 is also shown. Access control record R2 is specific to the storage device group "blade enclosure". The subject tag is "backup data". The "Share with/Don't Share with" part of the access control record R2 specifies that backup data cannot be shared with any other data types. This policy will ensure that all disks or servers in a whole blade enclosure will relate exclusively to backup data. There will thus be a blade enclosure in the rack of the data center that will be a dedicated back up enclosure.

Example groups may be based on grouping storage devices that are: (i) disk partitions in a common physical disk; (ii) physical disks in a common server; (iii) servers mounted on blades housed in a common blade enclosure; (iv) servers housed in a common rack; (v) racks or blades housed in a common cluster (=group of racks, for example, 30); (vi) clusters housed in a common room; (vii) clusters in a common building; (viii) buildings in a common site; and/or (ix) sites in a common jurisdiction.

In summary, each access control record defines a policy for a given data type in the context of a particular storage device group. The policy stipulates which data types are allowed to coexist within that group. Here it is noted that different groups can be at the same storage level and be of the same kind of storage device(s). For example, with reference to FIG. 1, datastore 132-1 may be one group and datastore 132-2 a second group, and datastore 132-3 a third group, and thus have different policies that govern the coexistence of different data types on each of them. The same may be true for virtual disk groups. As data are mapped downwards from the top tier of the data storage through any intermediate virtualization tier(s) to the physical storage tier, that appropriate separation of data types is maintained. So, for example, if separate virtual disks are created at a top tier for each of backup data, OS data and other data, then the policies should be specified to at least preserve separation between backup data and the data it is backing up at the physical data storage tier.

The data types in the data type record can each be identified by an identifying tag, which for example may be a text label. The identifying tag may conveniently be stored together with the logical unit number (LUN) of the logical unit of data.

Referring back to FIG. 1, the runtime manager 144 is responsible for management of the data operations. The management associates one of the data types with each logical unit of data, and controls movements of logical units of data within the system that take place as a result of data operations so as to maintain compliance with the policies defined in the access control records. Example data operations are: (i) a write, (ii) a delete, (iii) a copy, and/or (iv) a move.

Ideally the system should ensure that every logical unit of data are stored with an identifying tag to indicate its data type. However, it is also a useful precaution that the runtime manager is able to process logical units that do not have a recognized identifying tag, which might arise if a logical unit has an identifying tag, but the tag is not one stored in the data type record, or if there is no identifying tag. Consequently, it is useful if the runtime manager is operable to process a logical unit of data to detect absence of one of the recorded identifying tags. If there is no tag, or it is not recognized then the runtime manager is operable to apply a default policy to movements of such untagged logical units of data within the system. The default policy may be permissive and permit untagged logical units of data to share data storage devices with other logical units of data in an unrestricted manner. Alternatively, the default policy may be restrictive and does not permit untagged logical units of data to share data storage devices with at least some of the data types specified by the identifying tags. The default policy may also depend on data operation, for example, be different for each of the data operation types such as write, move, copy, and delete.

A useful feature is if the runtime manager is operable to generate an alert when a data operation cannot be performed without violating one of the policies. For example, the alert can be sent to a system administrator who could then provision additional storage to enable the data operation to be performed. Alternatively, the alert could be handled automatically if a system element has been programmed to deal with such a situation, for example, by applying logic to decide whether the data operation can nevertheless be performed in violation of the policy, or by having the ability to automatically provision additional storage, or the ability to perform a data cleanup process which may (or may not) release sufficient data storage space to enable the data operation to be performed without violating the policies.

The data storage devices may be grouped for the purpose of access control in various different ways. For example, a group may relate only to physical data storage devices or only to virtual data storage devices. Several groups are likely to consist of physical or virtual data storage devices that are situated in the same tier of the data storage hierarchy. Moreover, it is likely in many implementations that there are groups at different tiers, for example, one or more groups consisting of data storage devices in one tier and one or more groups consisting of data storage devices in another tier.

As described, the initial creation and subsequent movement of data, whether that be by manual movement (such as manual VM (virtual machine) migration) or automatic movement (such as tiering) is carried out in a way that ensures that data of inappropriate datatypes does not end up being stored on the same back-end disks. This is implemented by tagging the units of logical data (for example, with LUNs, filesystems or virtual disks) and applying policies in relation to the different tag types when performing data movements. An advantage of the proposed approach is that when LUNs, filesystems or virtual disks are moved applying the policies automatically leads to an appropriate selection of a target (or an alert indicating there is nowhere to store the data without violating the policies), without a system administrator having to think about what design constraints should be applied when moving data, for example, based on a written specification. The placing of data may be a different RAID Stripe, separate disks within a distributed RAID system, a different disk pool or a different tier. The net effect of applying the proposed approach is to avoid taking unintended risks when storing data, which may lead to data loss, for example, to avoid storing database data and its backup data together.

Figure 3:
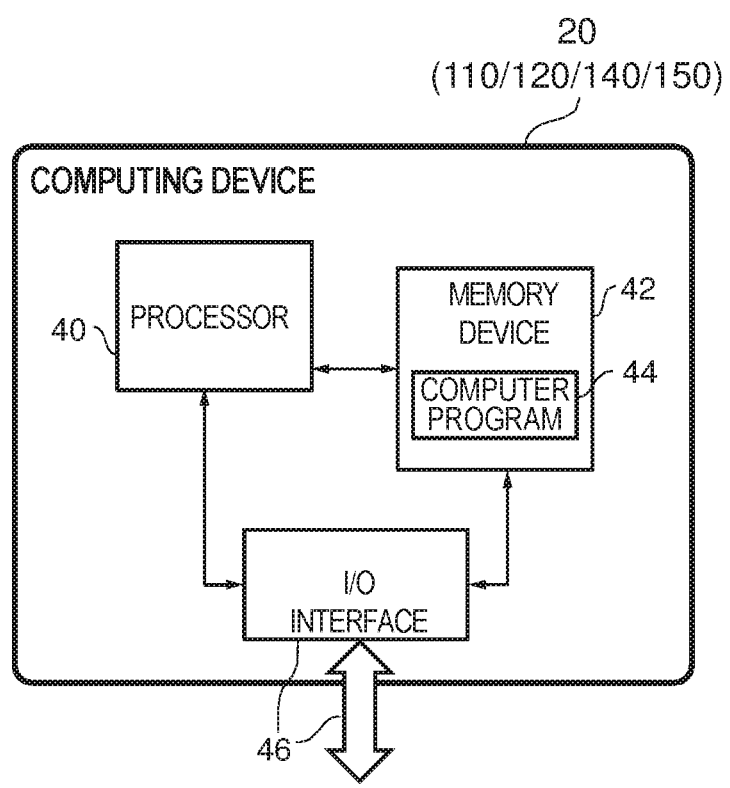
FIG. 3 shows internal structure of a generic computing device which may represent the internal design of computing elements shown in FIG. 1.

FIG. 3 shows a generic computing device 20, which may be one of the physical servers 110, one of the virtual machines 120, the data storage controller 140, or one of the user devices 150 described above. The computing device 20 comprises a processor 40 to provide a processor resource coupled through an I/O interface 46 to one or more external devices. The processor 40 may also be connected to one or more memory devices 42. At least one memory device 42 to provide a memory resource contains a stored computer program 44, which is a computer program that comprises computer-executable instructions. The data storage devices 48 may store the computer program 44. The computer program 44 stored in the storage devices 48 is configured to be executed by processor 40 via the memory devices 42. The processor 40 executes the stored computer program 44.

The proposed method combines a soft delete mechanism with a hard delete mechanism, wherein the soft deletion triggers the deleted volume's data to be gathered up and written to a compacted area of physical storage. This compaction function can be undertaken by the garbage collection mechanism. Ideally, the compaction is into a single contiguous block of physical storage, but in some cases the compaction could be into a small plural number of blocks, for example, 2 or 3, which may be necessary if the available storage space is so limited that storage into a contiguous block is impossible. By the time that a hard delete is needed for space utilization (or required for regulatory compliance), the soft deleted volume will therefore already have been compacted, thereby making its hard deletion easier and quicker to carry out. Moreover, in the interim period between compaction and hard deletion, the soft deleted volume is stored more space efficiently and in a way that reduces the resources that are required to keep knowledge of the soft deleted volume. We envisage that the storage controller manages the time gap between the soft delete and the subsequent hard delete with a time-to-live (TTL) or hop limit. The TTL may be implemented as a counter or timestamp attached to or embedded in the data volume to be deleted or its metadata. Once the prescribed event count or timespan has elapsed, action is taken to hard delete the previously soft deleted volume. In the regulatory scenario, the hard delete may comprise wiping the physical storage associated with the physical address space of the deleted volume's data units, for example, in the case of a magnetic storage medium by an overwrite with null data, thereby precluding later a physical recovery of the data units. In the space-management scenario, the hard delete need only remove all protection from the address space to be recycled, so there are no fetters from the operating system perspective to inhibit an over-write with new data.

The proposed method therefore envisages a three-step deletion involving a soft deletion step, a compaction step and a hard deletion step (or alternatively a restoration step). These steps may be implemented as follows: (i) Soft Delete: The volume is marked for deletion, for example, soft deleted. Host I/O to the volume is blocked. The storage controller assigns a TTL value to the deletion event; (ii) Compaction: The garbage collection (GC) is modified from standard so as to recognize and behave differently when it encounters an as yet uncompacted soft deleted volume. On encountering the first data unit (or metadata) of the soft deleted volume, the GC collects the soft deleted volume's data units (and optionally also its metadata) into a compacted area. The operating system may designate a dedicated contiguous block in the address range for compacted volumes, for example, those which have been soft deleted but not yet hard deleted, or the compacted volumes may be stored with address blocks located in amongst active volumes. Once compaction has been completed, the TTL parameter is started running, for example, as a countdown or timer. Since the compaction involves moving the volume's data units, the storage controller's metadata for the volume will also need to be updated, in order to retain the option of restoring the volume; and/or (iii) Permanent/hard delete: The compacted volume and its metadata (which may be held elsewhere by the storage controller) are discarded, thus freeing up physical storage space. A permanent or hard delete can be triggered by several reasons, for example, demand for the storage space, simply as a result of a policy that carries out a hard delete once the TTL has elapsed, or as a result of a policy created to comply with regulatory provisions. When hard delete occurs, the previously compacted data along with its metadata can be easily discarded, thus freeing up space in the storage system.

At any time up to the hard delete, restoration is possible. A restoration step may be as follows. Restoration: The soft deleted volume is restored by recreating the volume in the storage system and reapplying the volume's stored metadata.

In the proposed three-step deletion process, the volume remains recoverable, for example, restorable, up to the hard delete. The compaction also makes the hard delete quicker and simpler, so that the space is freed up much more quickly than if the soft deleted volume data were still fragmented over the physical storage.

Since up to the hard deletion, no storage space has actually been freed up, this can potentially cause problems. For example, it may be that an administrator performed the delete, because the storage system had reached near full capacity and so was not functioning efficiently. To avoid a conflict here, a feedback mechanism can be added into managing the TTL so that, when the storage controller detects unduly limited spare physical capacity, it can act to shorten the TTL of one or more, or potentially all, of the pending, soft deleted volumes, for example by speeding up decrements of their countdown counters, or zeroing the counter(s) that currently has (have) the lowest value(s).

A variable control can also be applied to speed up or slow down the counters responsive to the resource constraints on the storage system to react in a staged and/or ongoing manner in a control loop based on sensing a storage utilization parameter. In an extreme case in which the storage system is not currently resource constrained at all, then the countdown processes can be halted completely until such time that resource constraints become evident again.

As part of the compaction process, garbage collection will move the data for the provisionally deleted volume to a contiguous region of physical storage, thereby freeing up space in the regions that the provisionally deleted volume occupied at the time of the soft deletion. The thus compacted physical storage of the provisionally, that is soft, deleted volume is then stored more space efficiently.

The setting and management of the TTL can be implemented in various ways depending on system requirements. TTL can be a countdown of time-to-delete or based on a timestamp which sets an absolute time in the future to permanently delete the data. A countdown approach is simple to implement and also allows for easy control in case it is desired to lengthen or shorten the TTL on the fly. Once the compaction step is complete, TTL stacks to count down. For example, if the count is of days, then each day may cause a decrement of 1 and when zero is reached, the volume will be discarded, that is hard deleted. The TTL initial setting can be selected in a variety of ways; it can be set globally for the storage system, that is the same for all volumes or it can be set for a volume. When the TTL is set, it can also be chosen as desired. TTL may also be set when a delete command is issued by the soft delete stage, by the compaction stage, or much earlier at the time of volume creation. It is also possible for the TTL to operate with a combination of timestamp and counter. This may be useful for regulatory compliance. Specifically, the timestamp may provide a backstop hard deletion time, for example, to ensure that hard deletion occurs at the latest 24 hours after soft deletion, whereas the counter allows for earlier permanent deletion, if this is needed for space utilization.

Processes for storing and maintaining the metadata associated with a soft deleted volume may also be optimized (with or without deduplication) by compacting the storage volume's metadata either with the volume data or separately. The storage volume's metadata needs to be kept in case a restore is needed. Metadata compaction can also be subsumed in the volume data compaction step.

It is also possible for the storage system to cater for a partial hard delete, where the system only needs to reclaim an amount of space that is smaller than that occupied by the soft deleted volume. In this case, only a portion of the soft deleted volume's data are permanently deleted. The storage system can keep track of this and create virtual medium errors for the permanently deleted data.

The proposed method is compatible with, and can be adapted for, operation in storage systems that also operate with data deduplication. In a deduplication scheme, duplicated data segments (grains) are referenced as opposed to being stored multiple times. Deduplication generates referencing domains which are formed through references between grains, each referencing domain having a source grain containing a reference pointing to a location where data are stored and at least one referrer pointing to the source. A referencing domain is thus a set of grains that refer to a common source grain including the source grain and its referring grains. A source grain is the metadata containing the location of written data and a count of the number of its referrers. A referrer grain is the metadata containing a reference to source metadata for the data that has been written to that grain. A reference in this context is an address in metadata. Deduplication storage systems have processes that cater for the deletion of the initial data (source grain) that are now referenced by other volumes' data (referrer grains). Deleted data (source grains) that are referenced by another volume (referrer grains) can be retained but have their ownership changed to be assigned to another volume that is still normally stored, that is which has not been (soft) deleted. The source grain metadata are swapped with those of a referrer grain that is not in the (or another) soft deleted volume. Once completed, these swapping or ownership transfer steps to re-organize the referencing domains mean that the soft deleted volume will no longer have any source grains associated with it, only referrer grains. Consequently, once a hard delete is needed, it can be implemented much more quickly than if source grains were still involved, since the re-organization of the referencing domain's metadata, that is in any case required before permanent deletion can take place, has already been performed. The re-organization of referencing domains which have source grains in the soft deleted volume may be subsumed in the compaction process. It is also noted that the partial hard delete option discussed further above is also compatible with the proposed adaptation for deduplication.

In some designs, once a volume is soft deleted its grains are excluded from being used as a resource of new source grains. In such designs, the only remaining link to the deduplication system will be that some of the soft deleted grains will be referrer grains pointing to source grains in active volumes. However, there is also an alternative design option to continue to include soft deleted volumes in the deduplication processes in the sense that grains of a soft deleted volume provide a resource to avoid new writes in active domains from duplicating grains already present in soft deleted volumes. This is relevant for any non-duplicated grain, that is a source grain with no referrers, present in a soft deleted volume. The new grain to be saved in the active volume would be written as a referrer, with the grain in the soft deleted volume becoming its source. This will provide better deduplication efficiency compared to a design in which the active volumes are barred from generating new referrer links pointing to grains in soft deleted volumes. Moreover, should a soft deleted volume be restored, deduplication will have been maintained, that is the volumes would still be fully deduplicated. A consequence of allowing new referencing domains to be generated with sources located in soft deleted volumes is that hard deletes could potentially become slower, since any source grains in a previously soft deleted volume that is now to be hard deleted would have to be re-organized at the time of the hard deletion with the same factors as discussed in the previous paragraph in connection with soft deletes coming into play. This can be mitigated by swapping source and referrer in the same way as described above as a pre-step of the compaction. This can be integrated in the garbage collection, so that when the garbage collection encounters a source grain in a soft-deleted volume with at least one referrer in an active volume, it can perform the swap.

Figure 4:
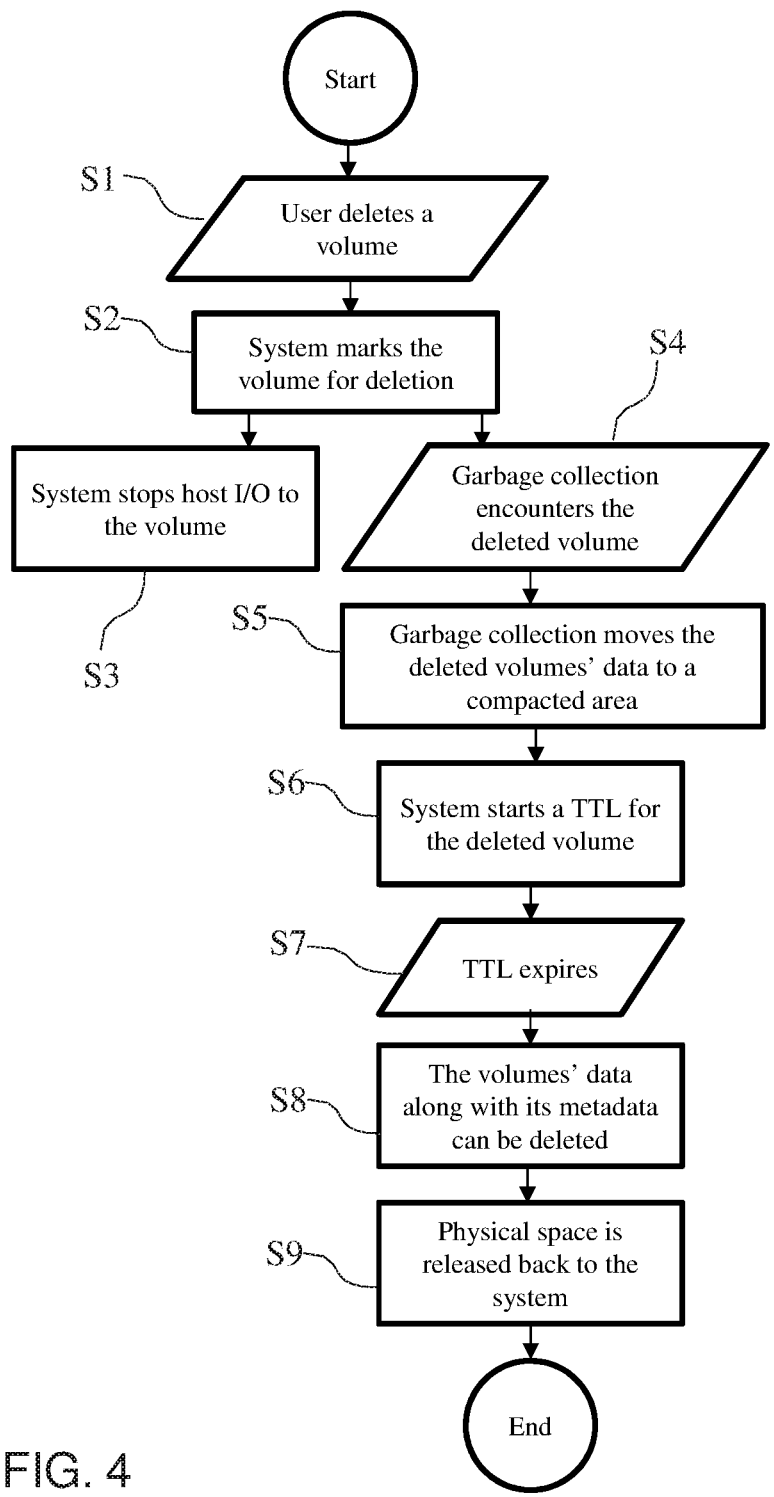
FIG. 4 is a flow chart of an example implementation of a delete function according to an embodiment of the disclosure.

FIG. 4 is a flow chart of an example implementation of a delete function according to an embodiment of the disclosure. Step S1: The user issues a command to delete a volume. S2: The storage controller marks the volume for deletion. S3: The storage controller stops host input/output (I/O) to the volume. S4: After an asynchronous amount of time, the garbage collection manager encounters a grain or other data fragment of the deleted volume. The encounter may also be of the volume's metadata. S5: The data fragments of the volume are gathered together and compacted into a contiguous block of physical storage. That will be a storage area in two-dimensional storage, or a storage volume in three-dimensional storage. S6: Once compaction is complete, the storage controller starts the TTL for the deleted volume. In other embodiments, the TTL could be started earlier, for example, when compaction is triggered by first encounter with the deleted volume, or even earlier in response to the initial delete command. The advantage of delaying TTL start until after compaction is complete is that the permanent delete will not occur until after the compaction. S7: The TTL expires. How the TTL may run in a concrete example is described in more detail further below with reference to FIG. 5. S8: The data units of the deleted volume are, or at least now can be, permanently deleted. For example, in Step S8, the data may be actively wiped in physical storage (for example, for regulatory compliance), or simply be freed up to be overwritten (for example, for storage utilization). S9: The physical storage space is released back for general use by the storage system. It will be noted that the principal functions described above may be managed solely or predominantly by the storage controller, or these functions may be managed by other storage system components in a more distributed manner.

Figure 5:
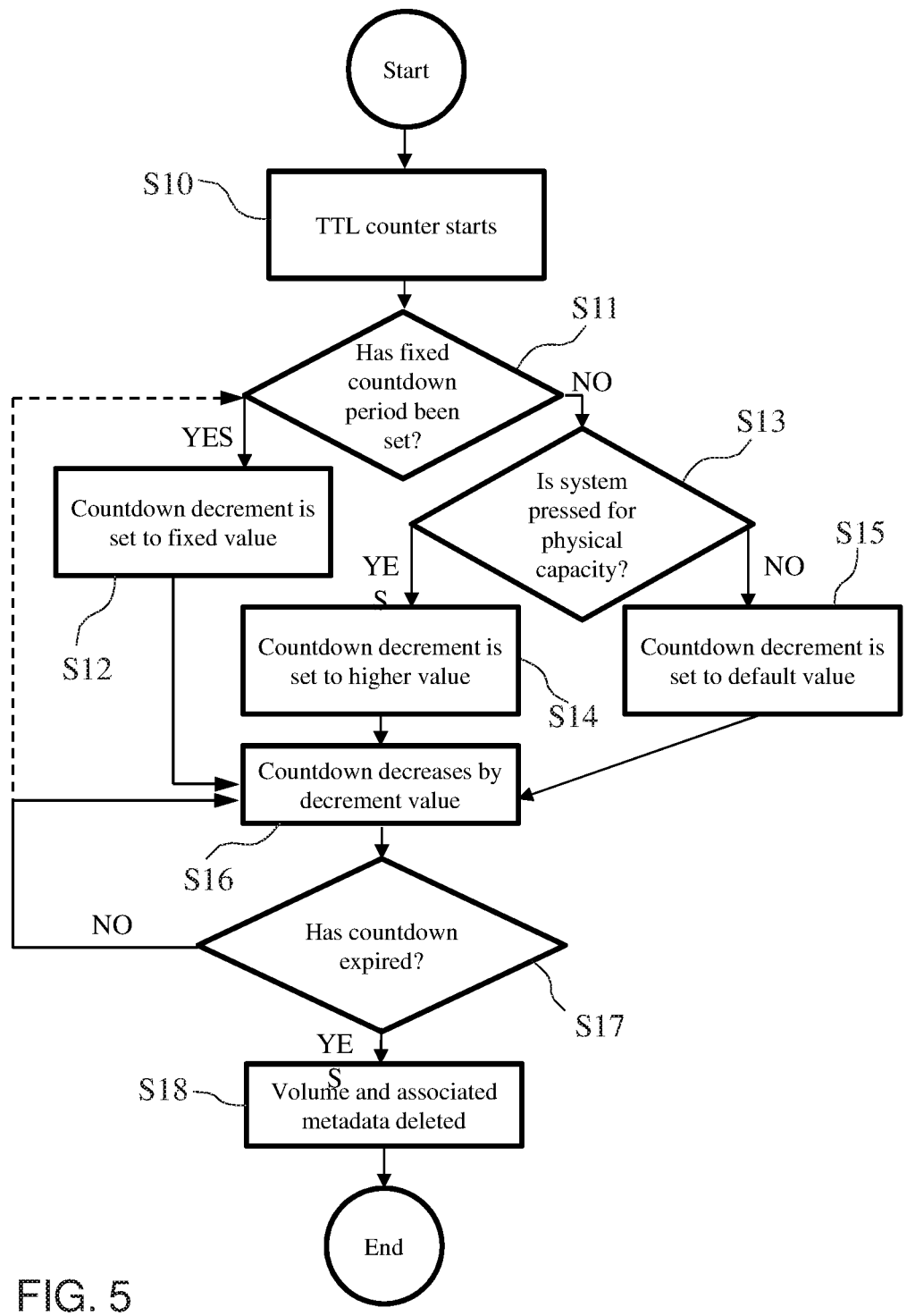
FIG. 5 is a flow chart of an example implementation of a time-to-live (TTL) counter that may be used in the delete function process of FIG. 4 or in other embodiments of the disclosure.

FIG. 5 is a flow chart of an example implementation of a TTL counter that may be used in the delete function of FIG. 4 or in other embodiments of the disclosure. Control of the TTL may be performed by the storage controller. Step S10: TTL counter starts. S11: It is checked whether a fixed countdown period is set, for example, as a global system value, or was previously set for the volume. If 'yes', then in Step S12 a value for the countdown decrement is determined so the intended countdown period is adhered to. If 'no', then in Step S13 the fullness state of the storage is checked. If the system is pressed for physical capacity, that is the space utilization is high, then the countdown can be made quicker by setting the decrement to a higher value, in Step S14. On the other hand, if the space utilization is low, then the countdown can proceed normally by setting the decrement to a default value in Step S15 (or leaving the value set in Step S12 unaltered). Although the space utilization test is shown in Step S13 as having a binary outcome—(in)adequate spare capacity—resulting in the decrement size being increased or left unchanged, a more graded or even continuous variation of the decrement may be performed. In Step S16, the counter is decremented. In Step S17, it is tested whether the countdown has expired (typically reached zero). If 'no', then the flow returns to make another decrement, either directly by returning to Step S16, or indirectly by returning to Step S11 (dotted line path). The direct return from Step S17 to Step S16 is for an implementation in which there is a once-only testing for spare capacity and a subsequent once-only determination of the decrement (solid line path from Step S17 to Step S16). However, with the return path from Step S17 to Step S11 (dotted line path), the flow allows the system to react to changes in the amount of spare capacity during the time the TTL is being counted down by repeatedly checking the free capacity (Step S13) and re-calculating the decrement size (S14/S15), where the decrement adjustments may be conditional on space utilization levels exceeding an upper threshold (indicating a performance bottleneck owing to lack of available storage space) and/or falling below a lower threshold (indicating no permanent deletions are needed for efficient storage management). Once the TTL expires, as shown by the 'no' result from Step S17, the permanent deletion can take place of the volume's data units and metadata in Step S18.

Reference to counting down and reaching zero are fully equivalent to counting up from zero to a maximum value (that is a timer is equivalent to a stop clock). Moreover, whether zero is the end or start is arbitrary, and any other value is equivalent. A general counter mechanism will be configured based on a start value and an end value and by defining a process for running a variable value from the former to the latter.

Figure 6A:
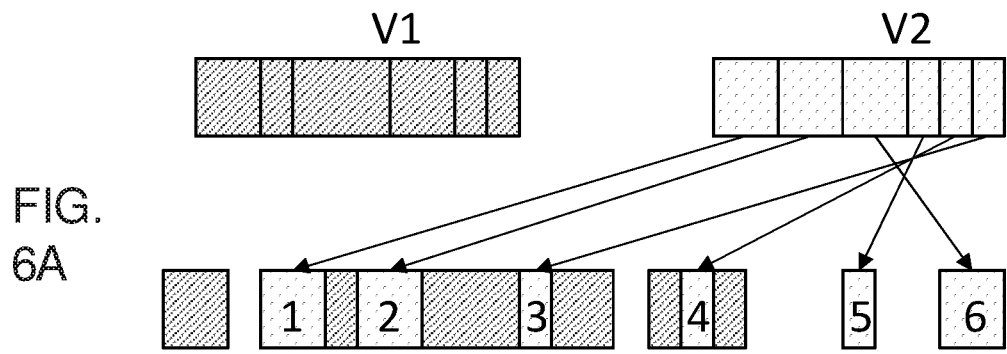
FIGS. 6A to 6C are schematic representations of virtual and physical address space distributions of first and second volumes in a virtualized storage system at three consecutive stages of carrying out a delete command on the second volume.
Figure 6B:
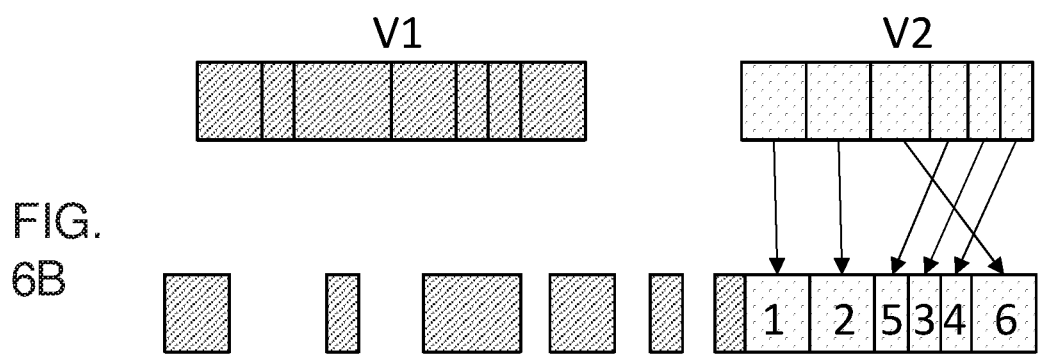
Figure 6C:
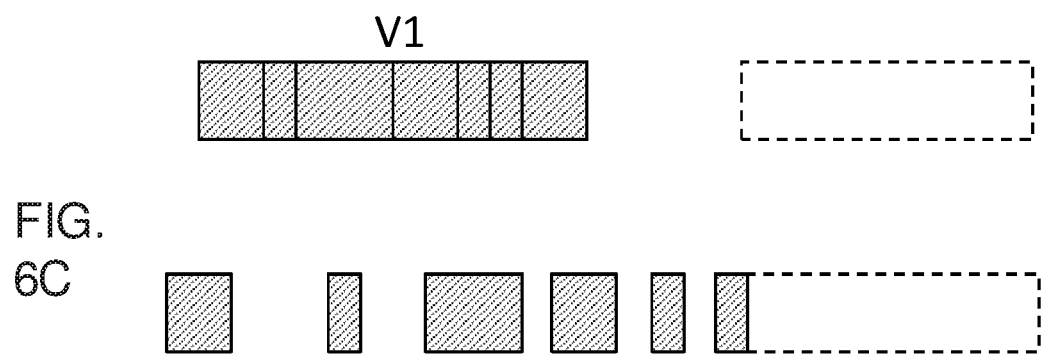

FIGS. 6A to 6C are schematic representations of virtual and physical address space distributions of first and second volumes in a virtualized storage system at three consecutive stages of carrying out a delete command on the second volume, namely at the time of the soft delete, after compaction, and at the time of the permanent delete. Each figure shows schematically address space of two volumes V1 and V2, shown hatched and stippled respectively, with the upper part of the drawing showing from left to right the virtual address space and the lower part the physical address space. While the volumes V1 and V2 occupy separate address space ranges in the virtual addressing, in the physical storage their data units are fragmented into multiple address sub-ranges of physical address space, and moreover the data units from the different volumes occupy a common range of physical address space with data units from Volume V1 interspersed with ones from Volume V2. The data units have an arbitrary size. The mapping from virtual to physical address space is schematically indicated with arrows for Volume V2. The mapping arrows for Volume V1 is omitted to avoid cluttering the drawing. At the time of the soft delete (FIG. 6A), the data from the two volumes are distributed as just described. After compaction (FIG. 6B), the various data units from the deleted volume, Volume V2, in physical address space have been gathered together to occupy a continuous range of physical addresses. After the hard delete (FIG. 6C), Volume V2 is cleared from both virtual and physical address space. The freed-up space is shown schematically with the dotted lines.

Figure 7A:
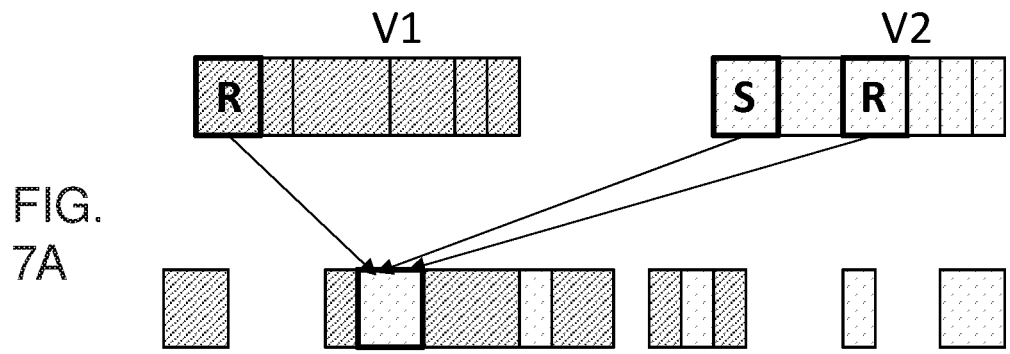
FIGS. 7A to 7C are schematic representations of virtual and physical address space distributions of first and second volumes in a virtualized storage system that also uses deduplication at three consecutive stages of carrying out a delete command on the second volume.
Figure 7B:
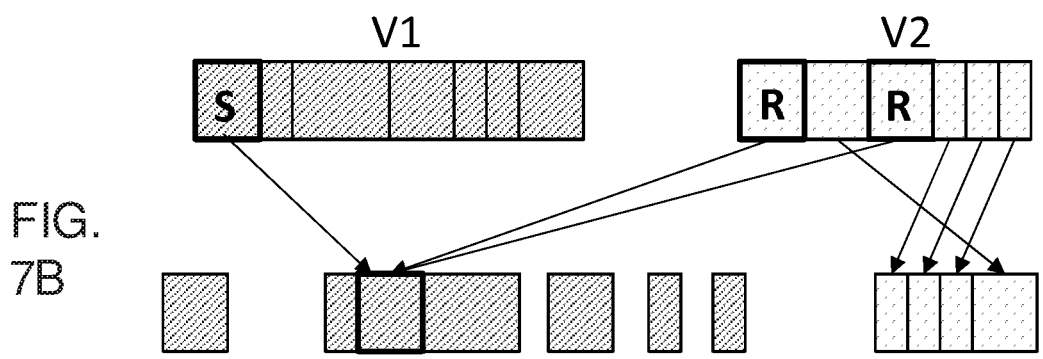
Figure 7C:
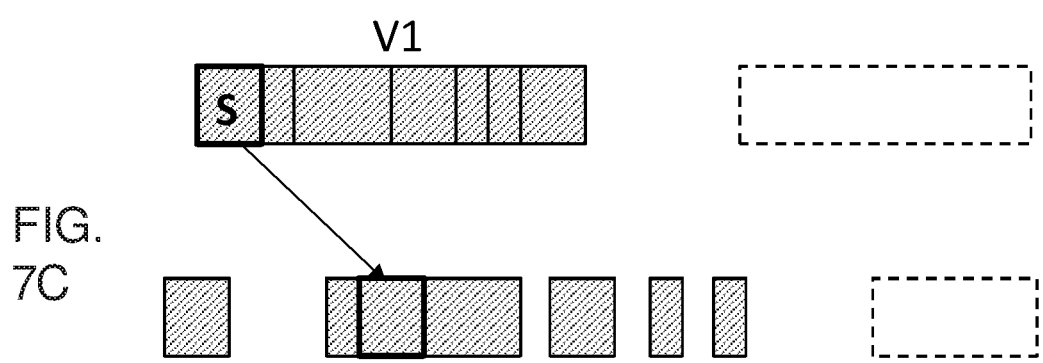

FIGS. 7A to 7C are schematic representations of virtual and physical address space distributions of first and second volumes in a virtualized storage system that also uses deduplication at three consecutive stages of carrying out a delete command on the second volume. Each figure shows schematically address space of two volumes V1 and V2, shown hatched and stippled respectively, with the upper part of the drawing showing from left to right the virtual address space and the lower part the physical address space. While the volumes V1 and V2 occupy separate address space ranges in the virtual addressing, in the physical storage their data units are fragmented into multiple address sub-range fragments in physical address space, and moreover the data units from the different volumes occupy a common range of physical address space with data units from Volume V1 interspersed with ones from Volume V2. The data units have an arbitrary size. The mapping from virtual to physical address space is schematically indicated with arrows, where the arrows are selectively only included to show mapping of a single exemplary referencing domain. Since the storage system operates with deduplication, a single data unit in physical address space can store multiple duplicate data units in virtual address space. This is shown schematically by the arrows pointing from multiple virtual address space data units to a single data fragment in physical address space. In a deduplication system, one of the virtualized "copies" of the duplicate data will "own" the data unit in physical address space (source grain), whereas the other duplicates (referrer grains) will only point to the data unit in physical storage via the source data unit. By way of example, we show the grains of one referencing domain which encompasses both Volume V1 and Volume V2 and consists of a source grain, labelled 'S', and two referrer grains, labelled 'R'. Volume V2 contains the source grain and one of the referrer grains. The other referrer grain is in Volume V2. The referencing domain thus extends over Volume V1 and Volume V2.

FIG. 7A shows that at the time of the soft delete the volume to be deleted, V2, "owns" the duplicated fragment. Compaction proceeds similarly to in the non-deduplication example above in that the various data units of the deleted volume V2 in physical address space are gathered together to occupy a continuous range of physical addresses. However, to take account of the deduplication, before moving the data units into the compacted area, it is checked whether the deleted volume has an ownership (source grain) role for any duplicated data units. If it does, as in the illustrated example, then, as an initial part of the compaction step (FIG. 7B), ownership is transferred to a duplicate in another volume, here Volume V1, which is not subject to a delete command. This additional relinquishing of the source grain role ensures that no data units are moved to the compacted area which will still need to be retained after the hard delete of the volume (here Volume V2) for the reason that they are needed by one or more other volumes (here Volume V1). Therefore, when a hard delete is actioned (FIG. 7C), the soft deleted and compacted volume does not contain physical storage of duplicated data units that need to be retained, that is does not have any source grains associated with it, only referrer grains. Consequently, when a hard delete is actioned, a contiguous block of physical address space can be released immediately. All that is needed is an amendment of the metadata to remove referrers pointing to (or from) the deleted volume. The freed-up space is shown schematically with the dotted lines.

It is also noted that, if the referencing domain is confined to the volume to be deleted, then no action is needed in respect of re-organizing the source and referrer roles within such a referencing domain, since there will be no knock-on effect to other volumes when the volume is permanently deleted. With reference to FIGS. 7A & 7B, this would be the situation if the referrer data unit in Volume V1 did not exist. A similar situation would arise if the volume being deleted contained a source data unit for a referencing domain that extends to another volume (or volumes) that has (or have) already been soft deleted, but not yet permanently deleted.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 8:
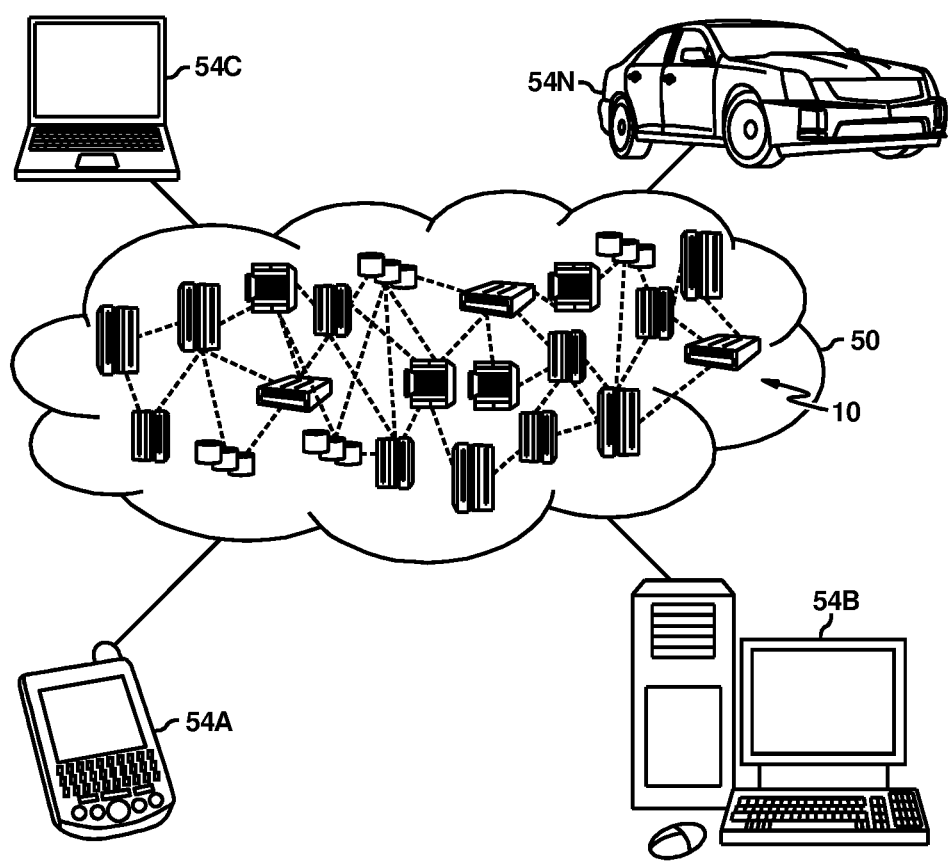
FIG. 8 depicts a cloud computer system according to an embodiment of the disclosure.

Referring now to FIG. 8, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computer system 50 can communicate with any type of computerized device over any type of network and/or network addressable connection (for example, using a web browser).

Figure 9:
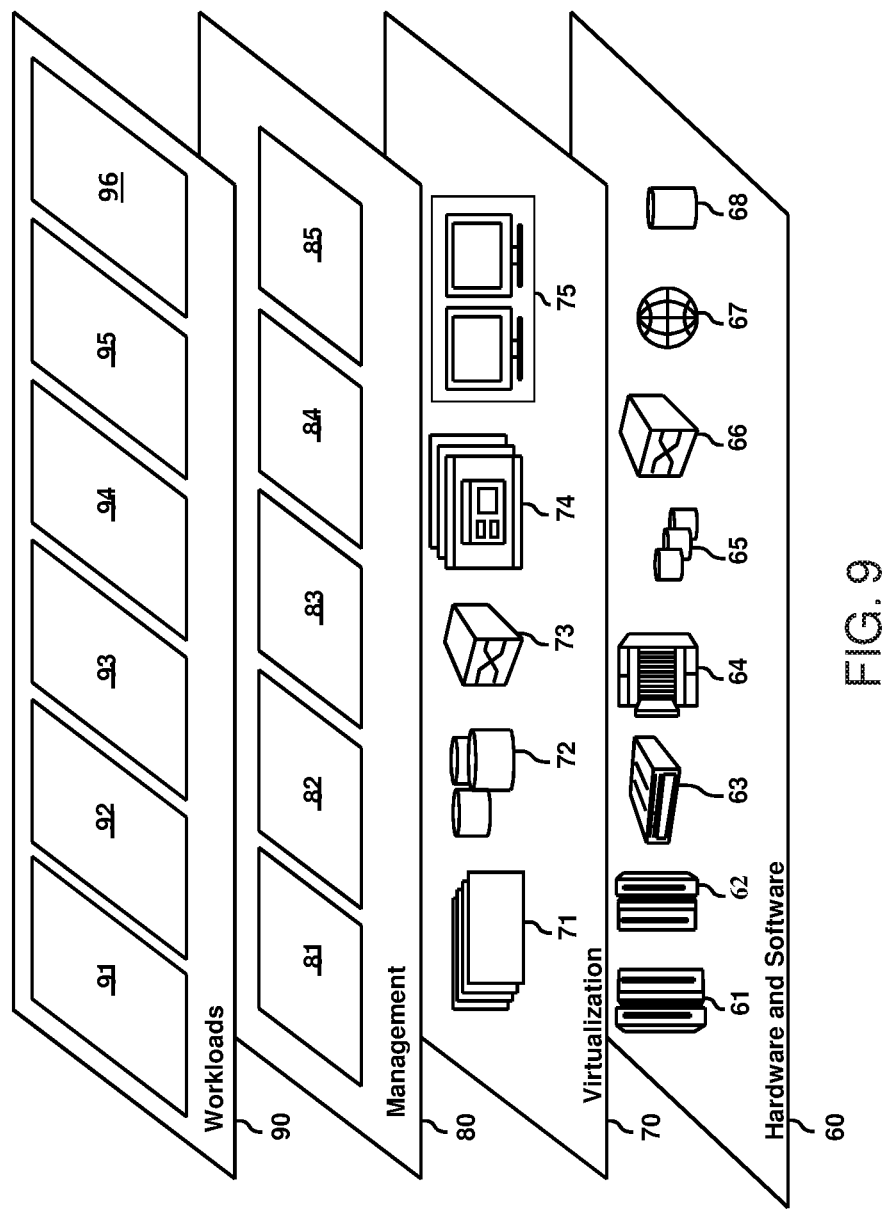
FIG. 9 depicts abstraction model layers according to an embodiment of the disclosure.

Referring now to FIG. 9, a set of functional abstraction layers provided by cloud computer system 50 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and storage controller 96 according to embodiments of the disclosure.

It will be clear to one skilled in the art that many improvements and modifications can be made to the foregoing exemplary embodiment without departing from the scope of the present disclosure.

Some Helpful Definitions Follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving a request to permanently delete a data volume in a virtualized data storage system, the data volume being accessible through a virtual address space that is mapped to a physical address space where the data of the data volume is physically stored;
   responsive to the receipt of the request to permanently delete the data volume, performing a soft delete of the data volume by marking for data of the data volume as deleted in order to block a host computer from accessing the data of the data volume and further by allocating a time-to-live (TTL) counter to the data of the data volume;
   subsequent to the performance of the soft delete, performing garbage collection on the data of the data volume by moving and compacting the data of the data volume into a designated compacted area and further by starting the allocated TTL counter;
   prior to expiration of the TTL counter, receiving a request to restore the data of the data volume; and
   responsive to the receipt of the request to restore the data volume, restoring the data of the data volume by mapping the data in the designated compacted area to the virtualized address space and unmarking the data of the data volume as deleted.

2. A computer program product (CPP) comprising:
   a set of storage device(s); and
   computer code stored collectively and non-transitively in the set of storage device(s), with the computer code including data and instructions to cause a processor(s) set to perform at least the following operations:
      receiving a request to permanently delete a data volume in a virtualized data storage system, the data volume being accessible through a virtual address space that is mapped to a physical address space where the data of the data volume is physically stored,
      responsive to the receipt of the request to permanently delete the data volume, performing a soft delete of the data volume by marking data of the data volume as deleted in order to block a host computer from accessing the data of the data volume and further by allocating a time-to-live (TTL) counter to the data of the data volume,
      subsequent to the performance of the soft delete, performing garbage collection on the data of the data volume by moving and compacting the data of the data volume into a designated compacted area and further by starting the allocated TTL counter,
      prior to expiration of the TTL counter, receiving a request to restore the data of the data volume, and
      responsive to the receipt of the request to restore the data volume, restoring the data of the data volume by mapping the data in the designated compacted area to the virtualized address space and unmarking the data of the data volume as deleted.

3. A computer system (CS) comprising:
   a processor(s) set;
   a set of storage device(s); and
   computer code stored collectively and non-transitively in the set of storage device(s), with the computer code including data and instructions to cause a processor(s) set to perform at least the following operations:
      receiving a request to permanently delete a data volume in a virtualized data storage system, the data volume being accessible through a virtual address space that is mapped to a physical address space where the data of the data volume is physically stored,
      responsive to the receipt of the request to permanently delete the data volume, performing a soft delete of the data volume by marking data of the data volume as deleted in order to block a host computer from accessing the data of the data volume and further by allocating a time-to-live (TTL) counter to the data of the data volume, subsequent to the performance of the soft delete, performing garbage collection on the data of the data volume by moving and compacting the data of the data volume into a designated compacted area and further by starting the allocated TTL counter, prior to expiration of the TTL counter, receiving a request to restore the data of the data volume, and responsive to the receipt of the request to restore the data volume, restoring the data of the data volume by mapping the data in the designated compacted area to the virtualized address space and unmarking the data of the data volume as deleted.

* * * * *